(12) United States Patent
Liu et al.

(10) Patent No.: US 12,542,577 B2
(45) Date of Patent: Feb. 3, 2026

(54) PARTIAL FREQUENCY SOUNDING WITH START RESOURCE BLOCK (RB) LOCATION HOPPING

(71) Applicant: LENOVO (BEIJING) LIMITED, Beijing (CN)

(72) Inventors: Bingchao Liu, Beijing (CN); Lingling Xiao, Beijing (CN); Chenxi Zhu, Fairfax, VA (US); Wei Ling, Beijing (CN); Yi Zhang, BeiJing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 5 days.

(21) Appl. No.: 18/694,344

(22) PCT Filed: Sep. 29, 2021

(86) PCT No.: PCT/CN2021/121681
§ 371 (c)(1),
(2) Date: Mar. 21, 2024

(87) PCT Pub. No.: WO2023/050140
PCT Pub. Date: Apr. 6, 2023

(65) Prior Publication Data
US 2025/0007556 A1    Jan. 2, 2025

(51) Int. Cl.
*H04B 1/7143*    (2011.01)
*H04B 7/06*    (2006.01)

(52) U.S. Cl.
CPC ......... *H04B 1/7143* (2013.01); *H04B 7/0626* (2013.01)

(58) Field of Classification Search
CPC ... H04B 1/7143; H04B 7/0626; H04L 5/0094; H04L 5/0051; H04L 5/0012
See application file for complete search history.

(56) References Cited

U.S. PATENT DOCUMENTS

2020/0213161 A1\* 7/2020 Zhang ................... H04W 80/08
2021/0250145 A1   8/2021 Choi
(Continued)

FOREIGN PATENT DOCUMENTS

CN    112602286 A    4/2021

OTHER PUBLICATIONS

ZTE. "Enhancements on SRS flexibility, coverage and capacity", 3GPP TSG RAN WG1 Meeting #106-e R1-2106546, Aug. 27, 2021; pp. 1-12.
(Continued)

*Primary Examiner* — Sam K Ahn
*Assistant Examiner* — Amneet Singh
(74) *Attorney, Agent, or Firm* — AMPACC Law Group, PLLC (57) ABSTRACT

Methods and apparatuses for partial frequency sounding with start RB location hopping are disclosed. A method comprises receiving a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0, 1, \ldots, P_F-1\}$; and determining the start RB location for each hop in each frequency hopping (FH) period according to the start RB location hopping pattern.

19 Claims, 6 Drawing Sheets

(56) References Cited

U.S. PATENT DOCUMENTS

2024/0022379 A1* 1/2024 Wang .................. H04L 27/2646
2024/0204934 A1* 6/2024 Sun ....................... H04L 5/0051
2024/0313913 A1* 9/2024 Gao ....................... H04L 5/0051

OTHER PUBLICATIONS

ZTE. "FL summary #1 on SRS enhancements", 3GPP TSG RAN WG1 Meeting #106-e R1-2108217, Aug. 27, 2021, pp. 1-59.
Huawei et al. "Enhancements on SRS in Rel-17", 3GPP TSG RAN WG1 Meeting #106-e R1-2106468, Aug. 27, 2021; pp. 1-16.
ZTE. "FL summary #2 on SRS enhancements", 3GPP TSG RAN WG1 Meeting #106-e R1-2108373, Aug. 27, 2021; 1-29.
ZTE. "Enhancements on SRS flexibility, coverage and capacity", 3GPP TSG RAN WG1 Meeting #104b-e R1-2102665, Apr. 20, 2021; pp. 1-11.
International Search Report and Written Opinion dated Apr. 25, 2022 for International Application No. PCT/CN2021/121681.
European search report dated May 19, 2025 for European patent application No. 21958730.0.
CATT: "Discussion on SRS enhancements for Rel-17" 3 GPP TSG RAN WG1 106-e; R1-2106940; Aug. 27, 2021; 11 pages.

* cited by examiner

PARTIAL FREQUENCY SOUNDING WITH START RESOURCE BLOCK (RB) LOCATION HOPPING

CROSS REFERENCE TO RELATED APPLICATIONS

This application is a national phase entry of International Application No. PCT/CN2021/121681, filed on Sep. 29, 2021, which is incorporated by reference in its entirety.

FIELD

The subject matter disclosed herein generally relates to wireless communications, and more particularly relates to methods and apparatuses for partial frequency sounding with start RB location hopping.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Sounding Reference Signal (SRS), frequency range 2 (FR2): indicating a frequency range of 24.25 GHz-52.6 GHz, Downlink control information (DCI), Media Access Control (MAC), MAC control element (MAC CE), Radio Resource Control (RRC), Resource Block (RB), RB level partial frequency sounding (RPFS), Frequency Hopping (FH), frequency domain resource allocation (FDRA), time domain resource allocation (TDRA), Hybrid Automatic Repeat request (HARQ).

Basic SRS function is specified in NR Release 15. The SRS function is enhanced in NR Release 16 to support high efficiency operation in FR2.

SRS resource can be configured as aperiodic SRS, semi-persistent SRS or periodic SRS. Aperiodic SRS resource can be triggered by DCI (e.g. DCI format 0_1 or DCI format 1_1) with a non-zero 'SRS request' field. Semi-persistent SRS resource is activated or deactivated by a Semi-persistent SRS Activation/Deactivation MAC CE. Periodic SRS resource can be triggered by a higher layer signaling (e.g. RRC signaling).

The SRS capacity, especially for the UE with lower mobility in small delay spread scenario, needs to be improved. One way to improve the SRS capacity is partial frequency sounding, which means that the SRS resource(s) is only transmitted on partial frequency band of the allocated frequency resources in a sounding hop. Each sounding hop corresponds to a sounding subband in a symbol. In frequency domain, SRS transmission should cover the frequency band that is of interest for the scheduler. One way is by means of narrower band SRS transmission, i.e., hopping in the frequency domain or frequency hopping. In this way, a sequence of SRS transmissions jointly covers the frequency band of interest. Each SRS transmission corresponds to a sounding hop. And each frequency hopping period is the period to sound the full frequency band of interest across the different subbands.

Traditionally, the frequency resources used for a SRS resource is determined by the number of RBs ($m_{SRS,B_{SRS}}$) configured for the SRS resource. The number of RBs ($m_{SRS,B_{SRS}}$) is determined by the RRC parameter $C_{SRS}$ and $B_{SRS}$ configured per SRS resource, as illustrated in Table 1 which is specified in 3GPP technical specification TS38.211 v16.0.0.

TABLE 1

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |

TABLE 1-continued

| $C_{SRS}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS, 0}$ | $N_0$ | $m_{SRS, 1}$ | $N_1$ | $m_{SRS, 2}$ | $N_2$ | $m_{SRS, 3}$ | $N_3$ |
| 62 | 272 | 1 | 68 | 4 | 4 | 17 | 4 | 1 |
| 63 | 272 | 1 | 16 | 17 | 8 | 2 | 4 | 2 |

One way to improve the SRS capacity is partial frequency sounding, which means that the SRS resource(s) is only transmitted on partial frequency band of the allocated frequency resources in a sounding hop. It has been agreed to support that the UE only transmits the SRS resource in $m_p$ ($m_p$ is the largest integer that is equal to or smaller than $$\left\lfloor \frac{1}{P_F} m_{SRS,B_{SRS}} \right\rfloor$$

) contiguous RBs in one OFDM symbol, where $m_{SRS,B_{SRS}}$ indicates the number of RBs for a sounding hop configured by RRC signaling, $P_F$ (partial frequency sounding factor) is a number that is larger than 1 (e.g. 2, 4 or 8) so that only partial frequency band is used to transmit the SRS resource. Incidentally, if $P_F=1$, the SRS resource(s) is transmitted on all the allocated frequency resources in a sounding hop. In other words, the partial frequency sounding is disabled if $P_F=1$.

Although partial frequency sounding in RB level brings power boosting gain, i.e., the limited power is transmitted in a narrow band and the power for each RE with SRS transmission is boosted compared with full frequency sounding with $P_F=1$, channel estimation accuracy may deteriorate significantly in some RBs without actual SRS transmission, especially for large $P_F$ value(s).

Figure 1:
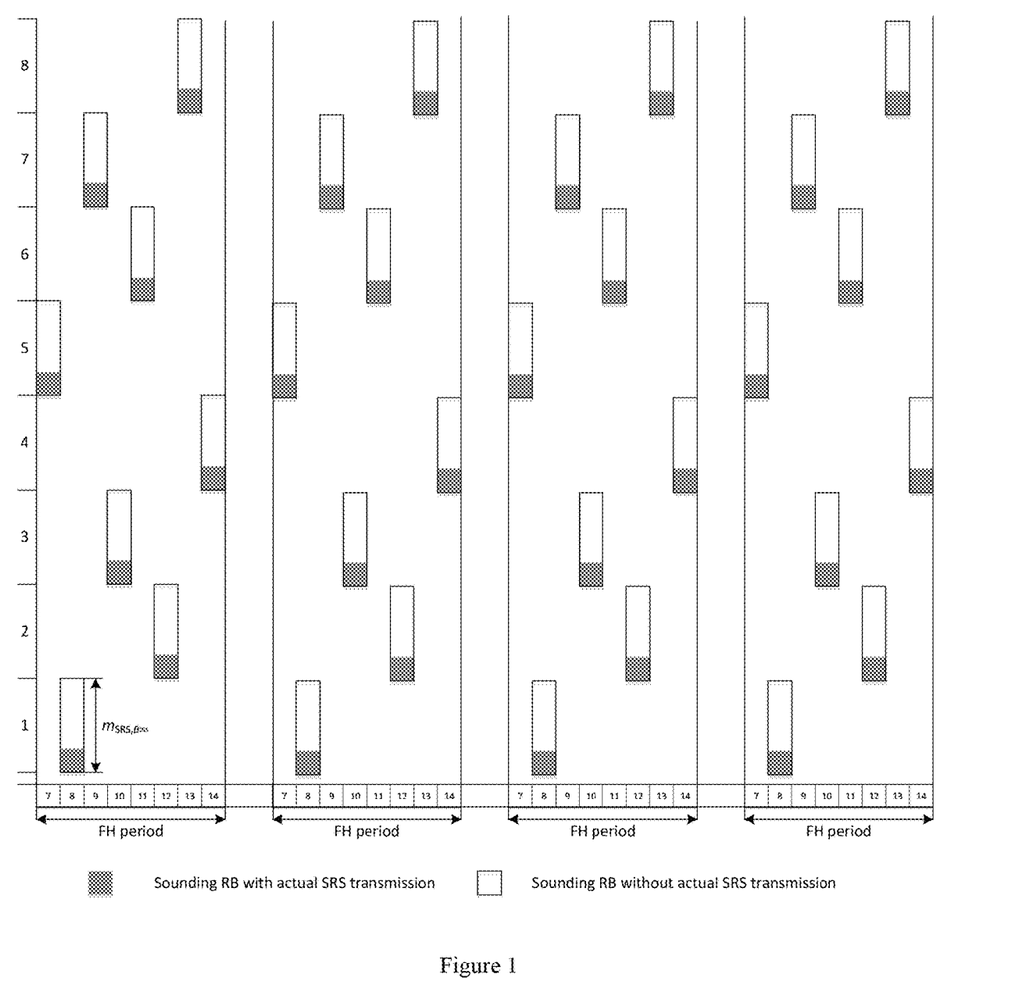
FIG. 1 illustrates a prior art RB level partial frequency sounding (RPFS)

FIG. 1 illustrates a prior art RB level partial frequency sounding (RPFS). In FIG. 1, the partial frequency sounding factor $P_F$ is equal to 4, the start RB location (i.e. start RB index) of the $$\frac{1}{P_F} m_{SRS,B_{SRS}} m_{SRS,B_{SRS}} RBs \text{ is } N_{offset} = \frac{k_F}{P_F} m_{SRS,B_{SRS}},$$

where $m_{SRS,B_{SRS}}$ indicates the number of RBs for a sounding hop configured by RRC signaling, $k_F$ indicates the start RB offset in the $m_{SRS,B_{SRS}}$ RBs, and $k_F=0$ in FIG. 1. In one Frequency Hopping (FH) period, there are 8 sounding hops configured for frequency hopping. It can be seen from FIG. 1 that in each of the hops 1 to 8, SRS is always transmitted in the first $$\frac{1}{P_F} m_{SRS,B_{SRS}} (= \frac{1}{4} m_{SRS,B_{SRS}})$$

On the other hand, no SRS is transmitted in any frequency bands starting from $$\frac{1}{4} m_{SRS,B_{SRS}}$$

to $m_{SRS,B_{SRS}}$ in any FH period.

It is expected that SRS can be transmitted in all $m_{SRS,B_{SRS}}$ frequency bands for each hop to improve channel estimation accuracy.

This disclosure targets the above issue.

BRIEF SUMMARY

Methods and apparatuses for partial frequency sounding with start RB location hopping are disclosed.

In one embodiment, a method comprises receiving a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values {0,1, . . . , $P_F$−1}; and determining the start RB location for each hop in each frequency hopping (FH) period according to the start RB location hopping pattern.

In one embodiment, the start RB location hopping pattern may be directly configured to the SRS resource. Alternatively in another embodiment, the start RB location hopping pattern may be configured by a hopping pattern ID. In particular, for $P_F=2$, hopping pattern ID 0 corresponds to start RB location hopping pattern {0, 1}; and hopping pattern ID 1 corresponds to start RB location hopping pattern {1, 0}, for $P_F=4$, hopping pattern ID 0 corresponds to start RB location hopping pattern {0, 2, 1, 3}; hopping pattern ID 1 corresponds to start RB location hopping pattern {2, 1, 3, 0}; hopping pattern ID 2 corresponds to start RB location hopping pattern {1, 3, 0, 2}; and hopping pattern ID 3 corresponds to start RB location hopping pattern {3, 0, 2, 1}, and for $P_F=8$, hopping pattern ID 0 corresponds to start RB location hopping pattern {0, 4, 2, 6, 1, 5, 3, 7}; hopping pattern ID 1 corresponds to start RB location hopping pattern {4, 2, 6, 1, 5, 3, 7, 0}; hopping pattern ID 2 corresponds to start RB location hopping pattern {2, 6, 1, 5, 3, 7, 0, 4}; hopping pattern ID 3 corresponds to start RB location hopping pattern {6, 1, 5, 3, 7, 0, 4, 2}; hopping pattern ID 4 corresponds to start RB location hopping pattern {1, 5, 3, 7, 0, 4, 2, 6}; hopping pattern ID 5 corresponds to start RB location hopping pattern {5, 3, 7, 0, 4, 2, 6, 1}; hopping pattern ID 6 corresponds to start RB location hopping pattern {3, 7, 0, 4, 2, 6, 1, 5}; and hopping pattern ID 7 corresponds to start RB location hopping pattern {7, 0, 4, 2, 6, 1, 5, 3}.

In yet another embodiment, the start RB location hopping pattern may be configured by one element of the start RB location hopping pattern that applies to the first hop of the first frequency hopping period, and the start RB location hopping pattern is determined by a cyclic pattern of a basic hopping pattern according to the one element. The one element of the start RB location hopping pattern may be indicated by an unused field of a DCI without data and without CSI if aperiodic SRS resource(s) are triggered by the DCI.

In some embodiment, the $\{(n \bmod P_F)+1\}^{th}$ element in the start RB location hopping pattern may apply to the start RB location of the SRS resource in all hops of the $n^{th}$ FH period. In this condition, the start RB location hopping pattern periodically applies to the every $P_F$ FH periods.

In some other embodiment, the $$\left\{ \left( n_{SRS} = \left\lfloor \frac{l'}{R} \right\rfloor \right) \bmod P_F + 1 \right\}^{th}$$

element of the start RB location hopping pattern may apply to the start RB location of the SRS resource in the $l'^{th}$ hop, where R is the SRS repetition number. In this condition, the start RB location hopping pattern periodically changes in $P_F$ contiguous FH periods.

In yet other embodiment, the $\{(l') \bmod P_F + 1\}^{th}$ element of the start RB location hopping pattern may apply to the start RB location of the SRS resource in the $l'^{th}$ hop, where R is the SRS repetition number. In this condition, the start RB location hopping pattern periodically changes in $P_F/R$ contiguous FH periods.

In one embodiment, a method at a base unit comprises transmitting a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0,1, \ldots, P_F-1\}$; and determining the start RB location for each hop in each frequency hopping (FH) period according to the start RB location hopping pattern In another embodiment, a remote unit (e.g. UE) comprises a receiver that receives a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0,1, \ldots, P_F-1\}$ and a processor that determines the start RB location for each hop in each frequency hopping (FH) period according to the start RB location hopping pattern.

In yet another embodiment, a base unit comprises a transmitter that transmits a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0,1, \ldots, P_F-1\}$ and a processor that determines the start RB location for each hop in each frequency hopping (FH) period according to the start RB location hopping pattern.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

A first embodiment relates to start RB location hopping for RB-level partial frequency sounding (RPFS).

According to the first embodiment, the start RB location (i.e. start RB index) of the $$\frac{1}{P_F} m_{SRS,B_{SRS}}$$

RBs in the $m_{SRS,B_{SRS}}$ RBs can be hopped in different frequency hopping (FH) periods, where $m_{SRS,B_{SRS}}$ indicates the number of RBs for a sounding hop configured by RRC signaling, $P_F$ is the partial frequency sounding factor. The initial start RB position $$N_{offset} = \frac{k_F}{P_F} m_{SRS,B_{SRS}}, k_F = \{0, \ldots, P_F - 1\}.$$

Figure 2:
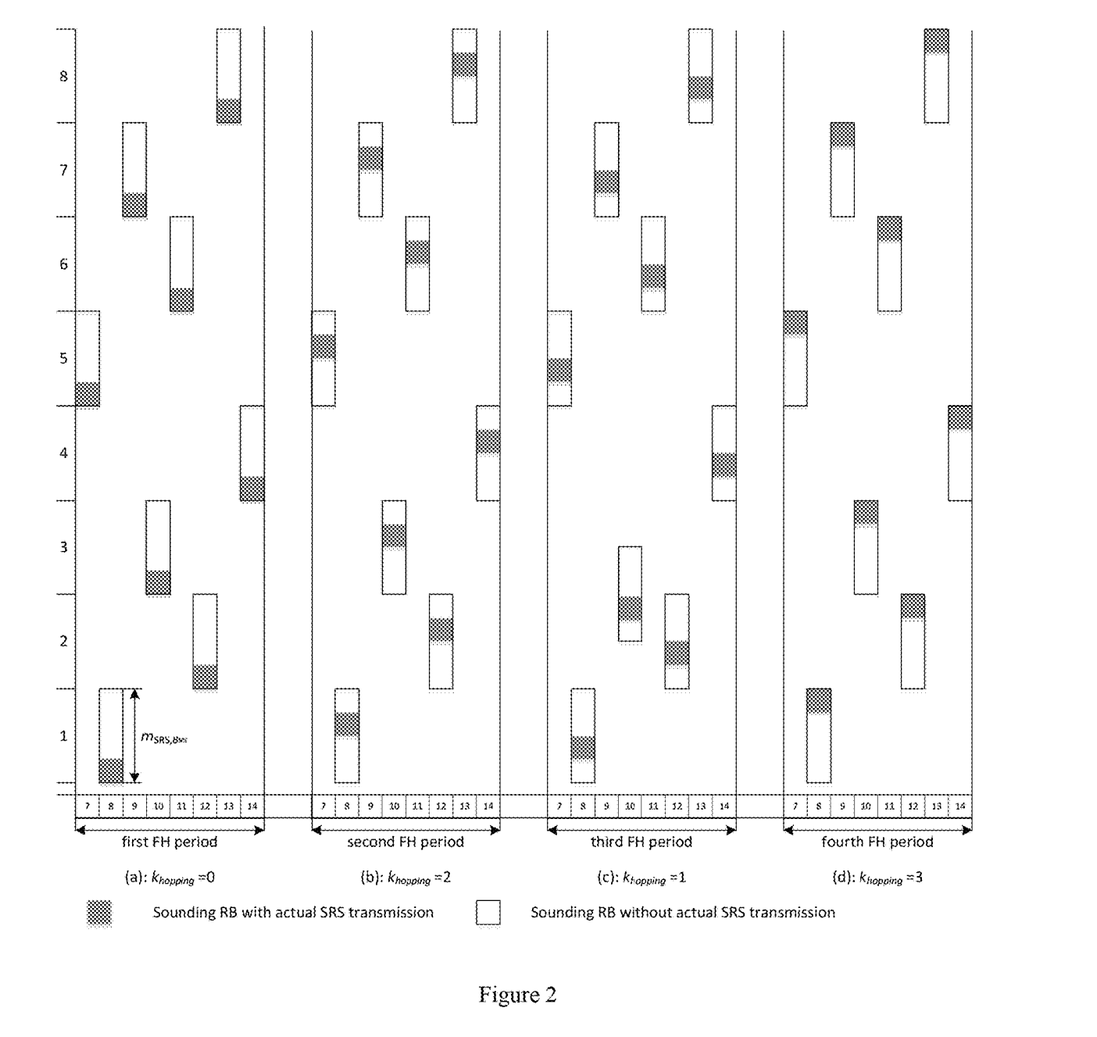
FIG. 2 illustrates an example of start RB location hopping for RPFS.

FIG. 2 provides an example of start RB location hopping for RPFS, where the partial frequency sounding factor $P_F$=4, $k_F$=0 and 8 hops are configured for frequency hopping (i.e. there are 8 hops in one Frequency Hopping (FH) period,) with $m_{SRS,B_{SRS}}$ being a multiple of 4 (e.g. $C_{SRS}$=9, i.e. $m_{SRS,B_{SRS}}$ is 32 or 16 or 8 or 4). SRS resources for 8 hops are transmitted in the last 8 symbols in one slot, e.g., the first hop is transmitted in the seventh symbol, the second hop is transmitted in the eighth symbol, the third hop is transmitted in the ninth symbol, the fourth hop is transmitted in the tenth symbol, the fifth hop is transmitted in the eleventh symbol, the sixth hop is transmitted in the twelfth symbol, the seventh hop is transmitted in the thirteenth symbol, the eighth hop is transmitted in the fourteenth symbol.

The allocated sounding band is $m_{SRS,B_{SRS}}$. It can be seen that the UE only transmits SRS on ¼ allocated sounding band (i.e.

$$\frac{1}{P_F} m_{SRS,B_{SRS}}$$

) in each symbol. According to the first embodiment, the start RB location for each FH period is determined by start RB location offset equation $$N_{offset} = \frac{(k_F + k_{hopping}) \bmod P_F}{P_F} m_{SRS,B_{SRS}},$$

where $P_F$ is partial frequency sounding factor; $k_F \in \{0, 1, \ldots, P_F-1\}$ is another parameter configured along with $P_F$ to determine the start RB location if partial frequency hopping is configured (in the following disclosure, $k_F$ is always configured to be 0); $m_{SRS,B_{SRS}}$ indicates the number of RBs for a sounding hop configured by RRC signaling; $k_{hopping}$ is determined by start RB location hopping pattern.

In FIG. 2, in the FH period shown in (a), the start RB location is $$N_{offset} = \frac{(k_F + k_{hopping}) \bmod P_F}{P_F} m_{SRS,B_{SRS}} = \frac{(0+0)\bmod 4}{4} \times m_{SRS,B_{SRS}} = 0,$$

where $k_{hopping}$=0; in the FH period shown in (b), the start RB location is $$N_{offset} = \frac{(k_F + k_{hopping}) \bmod P_F}{P_F} m_{SRS,B_{SRS}} =$$

$$\frac{(0+2)\bmod 4}{4} \times m_{SRS,B_{SRS}} = \frac{1}{2} \times m_{SRS,B_{SRS}},$$

where $k_{hopping}$=2; in the FH period shown in (c), the start RB location is $$N_{offset} = \frac{(k_F + k_{hopping}) \bmod P_F}{P_F} m_{SRS,B_{SRS}} =$$

$$\frac{(0+1)\bmod 4}{4} \times m_{SRS,B_{SRS}} = \frac{1}{4} \times m_{SRS,B_{SRS}},$$

where $k_{hopping}$=1; and in the FH period shown in (d), the start RB location is $$N_{offset} = \frac{(k_F + k_{hopping}) \bmod P_F}{P_F} m_{SRS,B_{SRS}} =$$

$$\frac{(0+3)\bmod 4}{4} \times m_{SRS,B_{SRS}} = \frac{3}{4} \times m_{SRS,B_{SRS}},$$

where $k_{hopping}$=3. Note that the FH periods shown in (a), (b), (c) and (d) are 4 contiguous FH periods. For example, (a) corresponds to the first FH period, (b) corresponds to the second FH period, (c) corresponds to the third FH period and (d) corresponds to the fourth FH period.

From the example shown in FIG. 2, in the first FH period shown in (a), $k_{hopping}$=0; in the second FH period shown in (b), $k_{hopping}$=2; in the third FH period shown in (c), $k_{hopping}$=1; and in the fourth FH period shown in (d), $k_{hopping}$=3. It can be seen that a hopping pattern {0, 2, 1, 3} with $P_F$ (i.e. partial frequency sounding factor, which is equal to 4 in the example of FIG. 2) values is applied to $P_F$ contiguous FH periods, so that each of the allocated sounding bands 1 to 8 are sounded in $P_F$ (=4) contiguous FH periods. So, the following observations can be made:

(1) All allocated sounding bands can be sounded by configuring appropriate start RB location hopping pattern.

(2) All allocated sounding bands can be sounded within $P_F$ (e.g. $P_F$=4 in FIG. 2) contiguous FH periods.

(3) The length of hopping pattern (e.g. pattern {0, 2, 1, 3} in FIG. 2) is equal to $P_F$.

(4) The valid element of hopping pattern or the valid start RB location with hopping $k_{hopping} \in \{0, 1, \ldots, P_F-1\}$ (e.g. $k_{hopping} \in \{0, 1, 2, 3\}$ in FIG. 2). That is, each element of the hopping pattern is selected from a different value of $\{0, 1, \ldots, P_F-1\}$. In other words, the values of $k_{hopping}$ are different in the contiguous $P_F$ FH periods, and selected from a set of values $\{0, 1, \ldots, P_F\}$.

(5) The configured hopping pattern will periodically apply to each FH period and begin from the first FH period. For example, the pattern {0, 2, 1, 3} applies to four (equal to $P_F$) contiguous FH periods shown in FIG. 2 and will continue to apply to next $P_F$ (equal to 4) FH periods (not shown in FIG. 2).

A second embodiment relates to specifying hopping pattern to an SRS resource.

According to a first sub-embodiment of the second embodiment, a fixed hopping pattern corresponding to each $P_F$ value is predetermined. A hopping offset (or hopping pattern index (ID)) is configured for each SRS resource or each SRS resource set along with $P_F$ and $k_F$. Note that the hopping offset (or hopping pattern ID) configured to an SRS resource set applies to all SRS resources within the SRS resource set. If the hopping offset or hopping pattern ID is not configured for an SRS resource, the UE assumes that start RB location hopping is disabled for the SRS resource, i.e., the UE shall assume $k_{hopping}=0$ for the SRS resource.

For example, the following hopping patterns corresponding to different $P_F$ values are proposed:

For $P_F=2$, the start RB location hopping pattern is configured as $\{0, 1\}$ for hopping pattern ID 0. The start RB location hopping pattern for periodic and semi-persistent SRS with $P_F=2$ is shown in Table 2.

TABLE 2

| hopping offset (or hopping pattern ID) | $k_{hopping}$ to be applied to the $n^{th}$ FH period of periodic of semi-persistent SRS resource | |
|---|---|---|
| | n mod $P_F$ = 0 | n mod $P_F$ = 1 |
| 0 | 0 | 1 |
| 1 | 1 | 0 |

For $P_F=4$, the start RB location hopping pattern is configured as $\{0, 2, 1, 3\}$ for hopping pattern ID 0. The start RB location hopping pattern for periodic and semi-persistent SRS with $P_F=4$ is shown in Table 3.

TABLE 3

| hopping offset (or hopping pattern ID) | $k_{hopping}$ to be applied to the $n^{th}$ FH period of periodic of semi-persistent SRS resource | | | |
|---|---|---|---|---|
| | n mod $P_F$ = 0 | n mod $P_F$ = 1 | n mod $P_F$ = 2 | n mod $P_F$ = 3 |
| 0 | 0 | 2 | 1 | 3 |
| 1 | 2 | 1 | 3 | 0 |
| 2 | 1 | 3 | 0 | 2 |
| 3 | 3 | 0 | 2 | 1 |

For $P_F=8$, the start RB location hopping pattern is configured as $\{0, 4, 2, 6, 1, 5, 3, 7\}$ for hopping pattern ID 0. The start RB location hopping pattern for periodic and semi-persistent SRS with $P_F=8$ is shown in Table 4.

TABLE 4

| hopping offset (or hopping pattern ID) | $k_{hopping}$ to be applied to the $n^{th}$ FH period of periodic of semi-persistent SRS resource | | | | | | | |
|---|---|---|---|---|---|---|---|---|
| | n mod $P_F$ = 0 | n mod $P_F$ = 1 | n mod $P_F$ = 2 | n mod $P_F$ = 3 | n mod $P_F$ = 4 | n mod $P_F$ = 5 | n mod $P_F$ = 6 | n mod $P_F$ = 7 |
| 0 | 0 | 4 | 2 | 6 | 1 | 5 | 3 | 7 |
| 1 | 4 | 2 | 6 | 1 | 5 | 3 | 7 | 0 |
| 2 | 2 | 6 | 1 | 5 | 3 | 7 | 0 | 4 |
| 3 | 6 | 1 | 5 | 3 | 7 | 0 | 4 | 2 |
| 4 | 1 | 5 | 3 | 7 | 0 | 4 | 2 | 6 |
| 5 | 5 | 3 | 7 | 0 | 4 | 2 | 6 | 1 |
| 6 | 3 | 7 | 0 | 4 | 2 | 6 | 1 | 5 |
| 7 | 7 | 0 | 4 | 2 | 6 | 1 | 5 | 3 |

Figure 3:
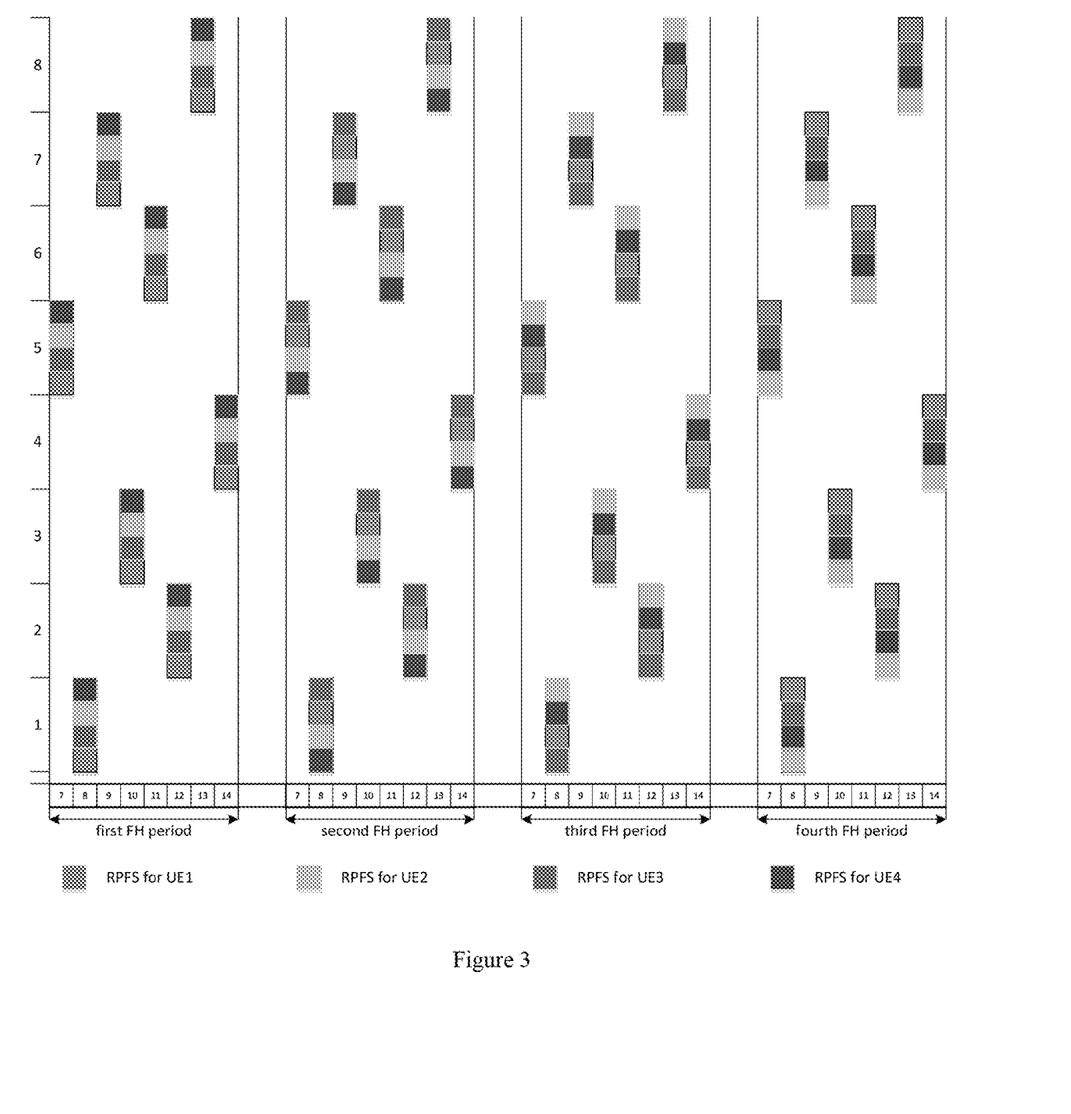
FIG. 3 illustrates an example of partial frequency sounding with start RB location hopping for all the SRS resources for different UEs.

FIG. 3 illustrates an example of partial frequency sounding with start RB location hopping for all the SRS resources for different UEs (e.g. four UEs), where $P_F=4$, $k_F=0$, and 8 hops are configured in one FH period with $m_{SRS,B_{SRS}}$ being a multiple of 4 (e.g. $C_{SRS}=9$ illustrated in Table 1, i.e. $m_{SRS,B_{SRS}}$ is 32 or 16 or 8 or 4). A hopping offset or hopping pattern ID with value 0 is configured for the SRS for UE1 (i.e. hopping pattern of $\{0, 2, 1, 3\}$ with reference to Table 3), a hopping offset or hopping pattern ID with value 1 is configured for the SRS for UE2 (i.e. hopping pattern of $\{2, 1, 3, 0\}$ with reference to Table 3), a hopping offset or hopping patter ID with value 2 is configured for the SRS for UE3 (i.e. hopping pattern of $\{1, 3, 0, 2\}$ with reference to Table 3), and a hopping offset or hopping patter ID with value 3 is configured for the SRS for UE4 (i.e. hopping pattern of $\{3, 0, 2, 1\}$ with reference to Table 3).

Instead of configuring the hopping offset (hopping pattern ID) to the UE, the gNB may alternatively configure the $k_{hopping}$ for the first hopping period of the SRS resource for a UE. The UE can derive the $k_{hopping}$ for each FH period (i.e. hopping pattern) of a periodic or semi-persistent SRS resource according to Table 2 (for $P_F=2$) or Table 3 (for $P_F=4$) or Table 4 (for $P_F=8$), according to the configured $k_{hopping}$ for the first hopping period. For example, for the example shown in FIG. 3, the gNB may configure $k_{hopping}=0$ for the SRS for UE1, configure $k_{hopping}=2$ for the SRS for UE2, configure $k_{hopping}=1$ for the SRS for UE3, and configure $k_{hopping}=3$ for the SRS for UE4.

According to a second sub-embodiment of the second embodiment, a hopping pattern (or a hopping sequence) with length $P_F$ may be directly configured to an SRS resource. If the hopping pattern is not configured for an SRS resource, the UE assumes that start RB location hopping is disabled for the SRS resource, i.e., the UE shall assume $k_{hopping}=0$ for the SRS resource.

That is, a hopping pattern corresponding to a different hopping offset can be directly configured to each SRS resource. For the example shown in FIG. 3, the hopping pattern $\{0, 2, 1, 3\}$ is configured to the SRS resource of UE 1, the hopping pattern $\{2, 1, 3, 0\}$ is configured to the SRS resource of UE 2, the hopping pattern $\{1, 3, 0, 2\}$ is configured to the SRS resource of UE 3, the hopping pattern $\{3, 0, 2, 1\}$ is configured to the SRS resource of UE 4.

The start RB location hopping pattern related parameters (e.g. hopping pattern ID, or $k_{hopping}$ value for the first FH period, or hopping pattern) for periodic and/or semi-persistent SRS resources can be configured by RRC signaling along with $P_F$ and $k_F$ for each SRS resource.

If the start RB location hopping pattern is enabled for aperiodic SRS, the start RB location hopping pattern related parameters can be indicated by the DCI triggering the aperiodic SRS. For example, if one SRS resource set is triggered by a DCI without data and without CSI triggering, the unused field, e.g., FDRA field, TDRA field or HARQ processing number indicator field, of the DCI can be used to indicate a $k_{hopping} \in \{0, 1, \ldots, P_F-1\}$ (or hopping pattern ID or hopping pattern) for the triggered SRS resource set(s). In this case, the indicated $k_{hopping}$ applies to all the SRS resources contained in the triggered SRS resource set(s).

A third embodiment relates to start RB location hopping within legacy FH period. In the first embodiment as shown in FIG. 2, the start RB location hops among different FH periods, while in each of the hops 1 to 8 in the same FH period, the start RB location is fixed. Similarly, in the second embodiment as shown in FIG. 3, the start RB location for a certain UE hops among different FH periods, while in each of the hops 1 to 8 in the same FH period, the start RB location for the certain UE is fixed (e.g. in the first FH period, the start RB location in each of the hops 1 to 8 for UE1 is 0). According to the third embodiment, the start RB location can hop within different hops in the same FH period.

Figure 4:
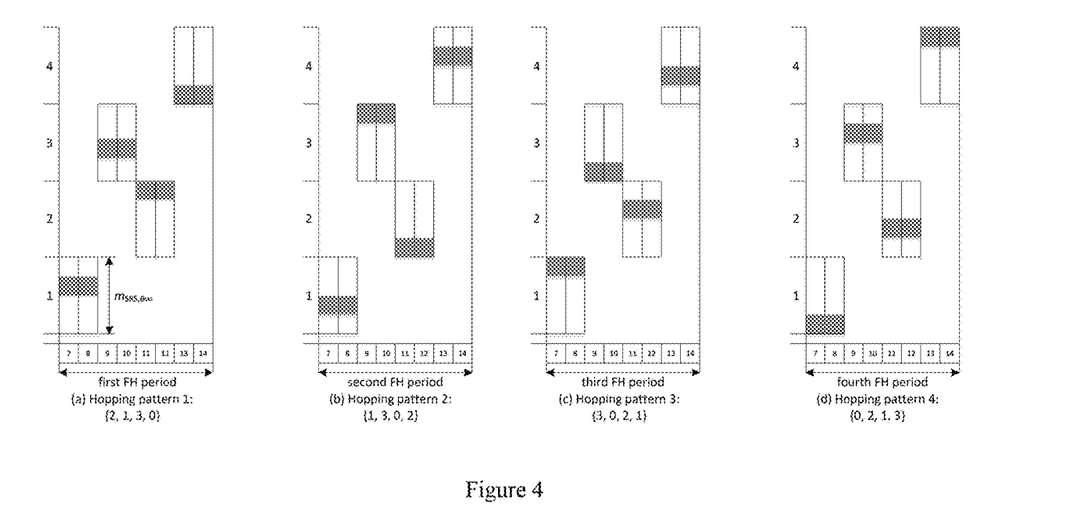
FIG. 4 illustrates an example of the third embodiment in which SRS repetition is configured along with start RB location hopping within FH period, while a same start RB location is determined for the repeated SRS symbols, and different start RB locations apply to SRS in different hops.

FIG. 4 illustrates an example of the third embodiment in which SRS repetition is configured along with start RB location hopping within FH period, while a same start RB location is determined for the repeated SRS symbols, and different start RB locations apply to SRS in different hops. In FIG. 4, there are 4 hops (i.e. hops 1 to 4) in one frequency hopping (FH) period. In addition, in each of hops 1 to 4, SRS is repeatedly transmitted twice (i.e. R=2).

If $$n_{SRS} = \left\lfloor \frac{l'}{R} \right\rfloor$$

is the number of SRS transmissions with $l' \in \{0, 1, \ldots, N_{symb}^{SRS}-1\}$, where $N_{symb}^{SRS}$ is the number of OFDM symbols used for SRS transmission ($N_{symb}^{SRS}=8$ in FIG. 4), and R is the SRS repetition number (R=2 in FIG. 4), the UE determines the start RB location for each SRS symbol of the SRS transmission according to ($n_{SRS}$ mod $P_F$) and the indicated hopping pattern ($P_F=4$ in FIG. 4). That is, the (($n_{SRS}$ mod $P_F$)+1)$^{th}$ $k_{hopping}$ in the indicated hopping pattern applies to the (l'+1)$^{th}$ SRS symbol.

In (a) of FIG. 4, the start RB location hopping pattern (i.e. hopping pattern 1) is configured to {2, 1, 3, 0} (i.e. the first to the fourth $k_{hopping}$ are 2, 1, 3, 0). The consecutive OFDM symbols used for SRS transmission are symbols 7 to 14, i.e. $N_{symb}^{SRS}=8$. Accordingly, $l' \in \{0, 1, 2, 3, 4, 5, 6, 7\}$ representing symbols 7, 8, 9, 10, 11, 12, 13 and 14, respectively.

$$n_{SRS} = \left\lfloor \frac{l'}{R} \right\rfloor = \{\lfloor 0/2 \rfloor, \lfloor 1/2 \rfloor \lfloor 2/2 \rfloor, \lfloor 3/2 \rfloor, \lfloor 4/2 \rfloor, \lfloor 5/2 \rfloor, \lfloor 6/2 \rfloor, \lfloor 7/2 \rfloor\} =$$

$$\{0, 0, 1, 1, 2, 2, 3, 3\}.$$

$n_{SRS}$ mod $P_F = n_{SRS}$ mod 4 = {0, 0, 1, 1, 2, 2, 3, 3}. So, by applying the (($n_{SRS}$ mod $P_F$)+1)$^{th}$ $k_{hopping}$ in the indicated hopping pattern to the (l'+1)$^{th}$ SRS symbol, $k_{hopping}$ {2, 2, 1, 1, 3, 3, 0, 0} are applied to the first to the eighth SRS symbol (i.e. symbols 7, 8, 9, 10, 11, 12, 13 and 14), respectively. Based on the start RB location equation $$N_{offset} = \frac{(k_F + k_{hopping}) \bmod P_F}{P_F} m_{SRS,B_{SRS}}$$

($k_F=0$ in FIG. 4), the start RB positions for the SRS transmission in symbols 7 to 14 (with l' equal to 0 to 7) are {2/4, 2/4, 1/4, 1/4, 3/4, 3/4, 0/4, 0/4}×$m_{SRS,B_{SRS}}$={1/2, 1/2, 1/4, 1/4, 3/4, 3/4, 0, 0}×$m_{SRS,B_{SRS}}$.

If the same hopping pattern (e.g. hopping pattern 1 of {2, 1, 3, 0}) applies to following FH periods, the same start RB position will periodically apply to all the hops across all the FH periods and begin from the first hop of the first FH period. For example, the start RB position for the first hop (i.e. hop 1) with 2 repetitions in all FH periods is always $$\frac{1}{2} \times m_{SRS,B_{SRS}}.$$

According to the third embodiment, the hopping pattern periodically changes in $P_F$ contiguous FH periods, so that each hop (e.g. each of hops 1 to 4) in the $P_F$ contiguous FH periods occupies a whole of $m_{SRS,B_{SRS}}$ RBs. For example, as shown in FIG. 4, in the first FH period (a), the hopping pattern 1 {2, 1, 3, 0} (i.e. hopping pattern ID 1 in Table 3) is configured; in the second FH period (b), the hopping pattern 2 {1, 3, 0, 2} (i.e. hopping pattern ID 2 in Table 3) is configured; in the third FH period (c), the hopping pattern 3 {3, 0, 2, 1} (i.e. hopping pattern ID 3 in Table 3) is configured; and in the fourth FH period (d), the hopping pattern 4 {0, 2, 1, 3} (i.e. hopping pattern ID 0 in Table 3) is configured. In other words, each of the four hopping pattern IDs 0 to 3 in Table 3 is configured to one FH period of the four contiguous FH periods. Accordingly, in $P_F$ (=4) contiguous FH periods, SRS is transmitted in all $m_{SRS,B_{SRS}}$ frequency bands. For example, the start RB position for the first hop (i.e. hop 1) with 2 repetitions in the first FH period is $$\frac{1}{2} \times m_{SRS,B_{SRS}};$$

the start RB position for the first hop (i.e. hop 1) with 2 repetitions in the second FH period is $$\frac{1}{4} \times m_{SRS,B_{SRS}};$$

the start RB position for the first hop (i.e. hop 1) with 2 repetitions in the third FH period is $$\frac{3}{4} \times m_{SRS,B_{SRS}};$$

and the start RB position for the first hop (i.e. hop 1) with 2 repetitions in the fourth FH period is 0. Accordingly, across $P_F$ (=4) contiguous FH periods, a whole of $m_{SRS,B_{SRS}}$ sound bands are occupied (i.e. with SRS transmitted) for the first hop (i.e. hop 1). Similarly, across $P_F$ (=4) contiguous FH periods, a whole of $m_{SRS,B_{SRS}}$ sound bands are occupied (i.e. with SRS transmitted) for each of hop 2, hop 3 and hop 4.

Figure 5:
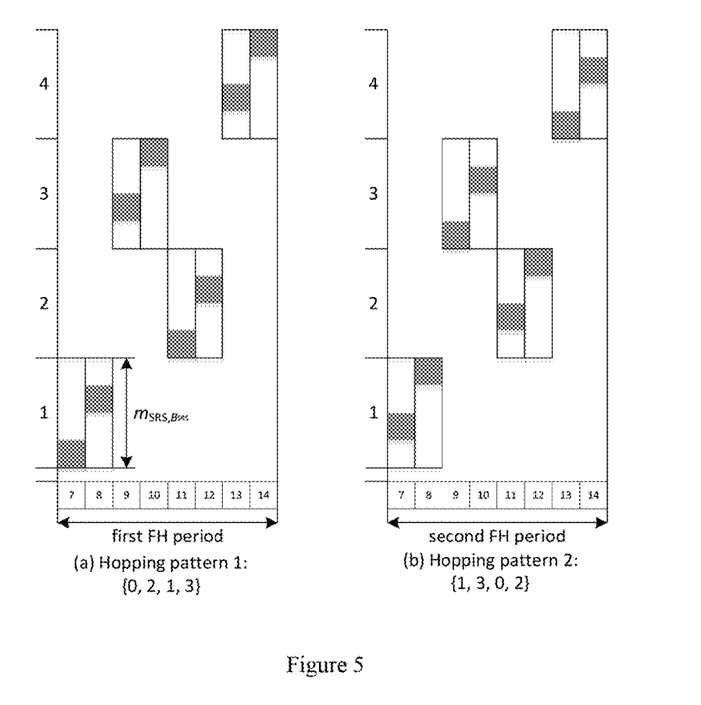
FIG. 5 illustrates an example of a variety of the third embodiment in which SRS repetition is configured along with start RB location hopping within FH period, while different start RB locations are determined for different SRS symbols regardless the SRS resource is configured with or without repetition.

FIG. 5 illustrates an example of a variety of the third embodiment in which SRS repetition is configured along with start RB location hopping within FH period, while different start RB locations are determined for different SRS symbols regardless the SRS resource is configured with or without repetition.

In the example of FIG. 5, a different start RB location is determined for the repeated SRS symbols, and different start RB locations apply to SRS in different hops based on the indicated hopping pattern. In FIG. 5, there are 4 hops (i.e. hops 1 to 4) in one frequency hopping (FH) period. In addition, in each of hops 1 to 4, SRS is repeatedly transmitted twice (i.e. R=2) although in different frequency bands.

The UE determines the start RB location for each SRS symbol according to (l' mod $P_F$) and the indicated hopping pattern. That is, the $((l' \bmod P_F)+)^{th}$ $k_{hopping}$ in the indicated hopping pattern applies to the $(l'+1)^{th}$ SRS symbol.

In (a) of FIG. 5, the start RB location hopping pattern (i.e. hopping pattern 1) is configured to {0, 2, 1, 3} (i.e. the first to the fourth $k_{hopping}$). The consecutive OFDM symbols used for SRS transmission are symbols 7 to 14, i.e. $N_{symb}^{SRS}=8$. Accordingly, l'∈ {0, 1, 2, 3, 4, 5, 6, 7}. l' mod $P_F$=l' mod 4={0, 1, 2, 3, 0, 1, 2, 3}. So, by applying the ((l' mod $P_F$)+1)$^{th}$ $k_{hopping}$ in the indicated hopping pattern to the $(l'+1)^{th}$ SRS symbol, $k_{hopping}$ {0, 1, 2, 3, 0, 1, 2, 3} are applied to the first to the eighth SRS symbol (i.e. symbols 7, 8, 9, 10, 11, 12, 13 and 14), respectively. Based on the start RB location equation $$N_{offset} = \frac{(k_F + k_{hopping}) \bmod P_F}{P_F} m_{SRS,B_{SRS}}$$

($k_F$=0 in FIG. 5), the start RB positions for symbols 7 to 14 (with l' equal to 0 to 7) are {0/4, 2/4, 1/4, 3/4, 0/4, 2/4, 1/4, 3/4}×$m_{SRS,B_{SRS}}$={0, 1/2, 1/4, 3/4, 0, 1/2, 1/4, 3/4}×$m_{SRS,B_{SRS}}$.

If the same hopping pattern (e.g. hopping pattern 1 of {0, 2, 1, 3}) applies to following FH period(s), the same start RB positions will periodically apply to all the hops across all the FH periods and begin from the first hop of the first FH period. For example, the start RB positions for the first hop (i.e. hop 1) with 2 repetitions in all FH periods are always 0 and $$\frac{1}{2} \times m_{SRS,B_{SRS}}.$$

According to the variety of the third embodiment, the hopping pattern periodically changes in $P_F$/R contiguous FH periods, so that each hop in the $P_F$/R contiguous FH periods occupy a whole of $m_{SRS,B_{SRS}}$ RBs.

For example, as shown in FIG. 5, in the first FH period (a), the hopping pattern 1 {0, 2, 1, 3} (i.e. hopping pattern ID 0 in Table 3) is configured; and in the second FH period (b), the hopping pattern 2 {1, 3, 0, 2} (i.e. hopping pattern ID 2 in Table 3) is configured. In other words, $P_F$/R hopping pattern IDs are configured to $P_F$/R contiguous FH periods. The $P_F$/R hopping pattern IDs should be selected so that all $k_{hopping}$ values are present in the first R elements of the $P_F$/R hopping patterns (e.g. all even hopping pattern IDs or all odd hopping pattern IDs if R=2). For example, the first R (=2) elements of the $P_F$/R (=2) hopping pattern IDs 0 and 2 are respectively 0, 2 and 1, 3. So, all $k_{hopping}$ values 0, 1, 2, and 3 are present. Accordingly, the start RB positions for the first hop (i.e. hop 1) with 2 repetitions in the first FH period are 0 and $$\frac{1}{2} \times m_{SRS,B_{SRS}};$$

and the start RB positions for the first hop (i.e. hop 1) with 2 repetitions in the second FH period are $$\frac{1}{4} \times m_{SRS,B_{SRS}} \text{ and } \frac{3}{4} \times m_{SRS,B_{SRS}}.$$

Accordingly, across $P_F$/R (=2) contiguous FH periods, a whole of $m_{SRS,B_{SRS}}$ sound bands are occupied (i.e. with SRS transmitted) for the first hop (i.e. hop 1). Similarly, across $P_F$/R (=2) contiguous FH periods, a whole of $m_{SRS,B_{SRS}}$ sound bands are occupied (i.e. with SRS transmitted) for each of hop 2, hop 3 and hop 4.

The SRS resource can be aperiodic, periodic and/or semi-persistent. For aperiodic SRS resource, the gNB may configure or indicate a hopping pattern for an aperiodic SRS resource by RRC or DCI. For periodic and/or semi-persistent SRS resources, the UE periodically applies the indicated hopping pattern to the SRS symbols of each SRS resource.

Figure 6:
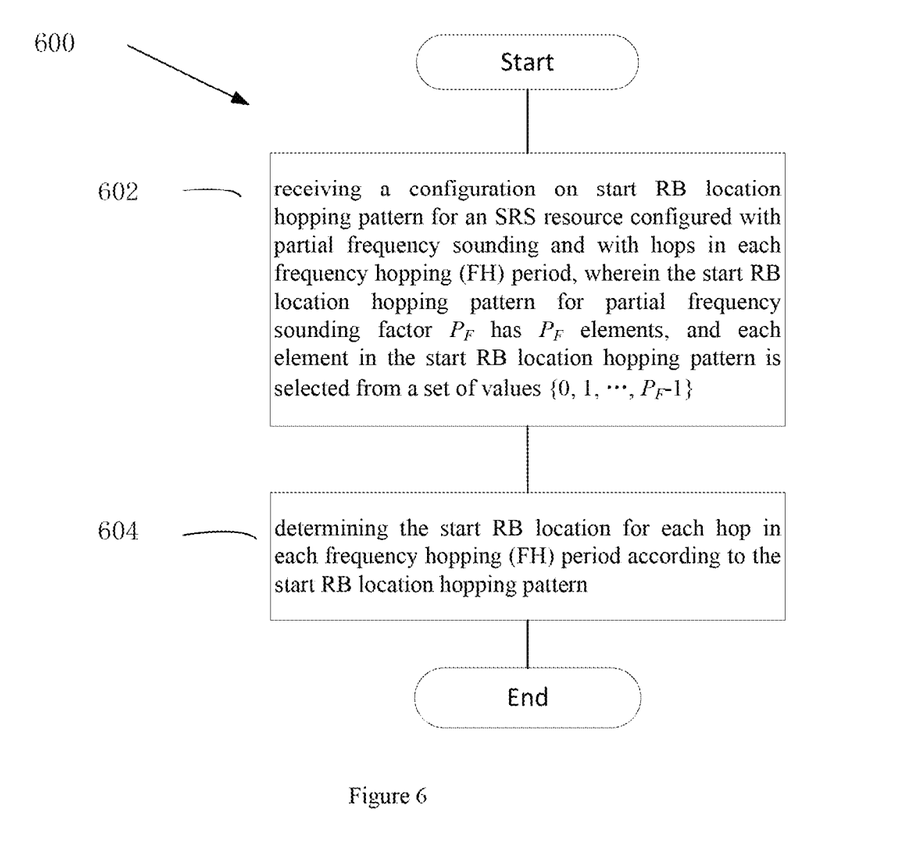
FIG. 6 is a schematic flow chart diagram illustrating an embodiment of a method.

FIG. 6 is a schematic flow chart diagram illustrating an embodiment of a method 600 according to the present application. In some embodiments, the method 600 is performed by an apparatus, such as a base unit. In certain embodiments, the method 600 may be performed by a processor executing program code, for example, a microcontroller, a microprocessor, a CPU, a GPU, an auxiliary processing unit, a FPGA, or the like.

The method 600 may comprise 602 receiving a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values {0,1, . . . , $P_F$−1}; and 604 determining the start RB location for each hop in each frequency hopping (FH) period according to the start RB location hopping pattern.

The start RB location hopping pattern may be directly configured to the SRS resource. Alternatively, the start RB location hopping pattern may be configured by a hopping pattern ID. In particular, for $P_F$=2, hopping pattern ID 0 corresponds to start RB location hopping pattern {0, 1}; and hopping pattern ID 1 corresponds to start RB location hopping pattern {1, 0}, for $P_F$=4, hopping pattern ID 0 corresponds to start RB location hopping pattern {0, 2, 1, 3}1; hopping pattern ID 1 corresponds to start RB location hopping pattern {2, 1, 3, 0}; hopping pattern ID 2 corresponds to start RB location hopping pattern {1, 3, 0, 2}; and hopping pattern ID 3 corresponds to start RB location hopping pattern {3, 0, 2, 1}, and for $P_F$=8, hopping pattern ID 0 corresponds to start RB location hopping pattern {0, 4, 2, 6, 1, 5, 3, 7}; hopping pattern ID 1 corresponds to start RB location hopping pattern {4, 2, 6, 1, 5, 3, 7, 0}; hopping pattern ID 2 corresponds to start RB location hopping pattern {2, 6, 1, 5, 3, 7, 0, 4}; hopping pattern ID 3 corresponds to start RB location hopping pattern {6, 1, 5, 3, 7, 0, 4, 2}; hopping pattern ID 4 corresponds to start RB location hopping pattern {1, 5, 3, 7, 0, 4, 2, 6}; hopping pattern ID 5 corresponds to start RB location hopping pattern {5, 3, 7, 0, 4, 2, 6, 1}; hopping pattern ID 6 corresponds to start RB location hopping pattern {3, 7, 0, 4, 2, 6, 1, 5}; and hopping pattern ID 7 corresponds to start RB location hopping pattern {7, 0, 4, 2, 6, 1, 5, 3}.

The start RB location hopping pattern may be configured by one element of the start RB location hopping pattern that applies to the first hop of the first frequency hopping period, and the start RB location hopping pattern is determined by a cyclic pattern of a basic hopping pattern according to the one element. The one element of the start RB location hopping pattern may be indicated by an unused field of a DCI without data and without CSI if aperiodic SRS resource(s) are triggered by the DCI.

The $\{(n \bmod P_F)+1\}^{th}$ element in the start RB location hopping pattern may apply to the start RB location of the SRS resource in all hops of the $n^{th}$ FH period. In this condition, the start RB location hopping pattern periodically applies to the every $P_F$ FH periods.

The $$\left\{\left(n_{SRS} = \left\lfloor \frac{l'}{R} \right\rfloor\right) \bmod P_F + 1\right\}^{th}$$

element of the start RB location hopping pattern may apply to the start RB location of the SRS resource in the $l'^{th}$ hop, where R is the SRS repetition number. In this condition, the start RB location hopping pattern periodically changes in $P_F$ contiguous FH periods.

The $\{(l') \bmod P_F+1\}^{th}$ element of the start RB location hopping pattern may apply to the start RB location of the SRS resource in the $l'^{th}$ hop, where R is the SRS repetition number. In this condition, the start RB location hopping pattern periodically changes in $P_F/R$ contiguous FH periods.

Figure 7:
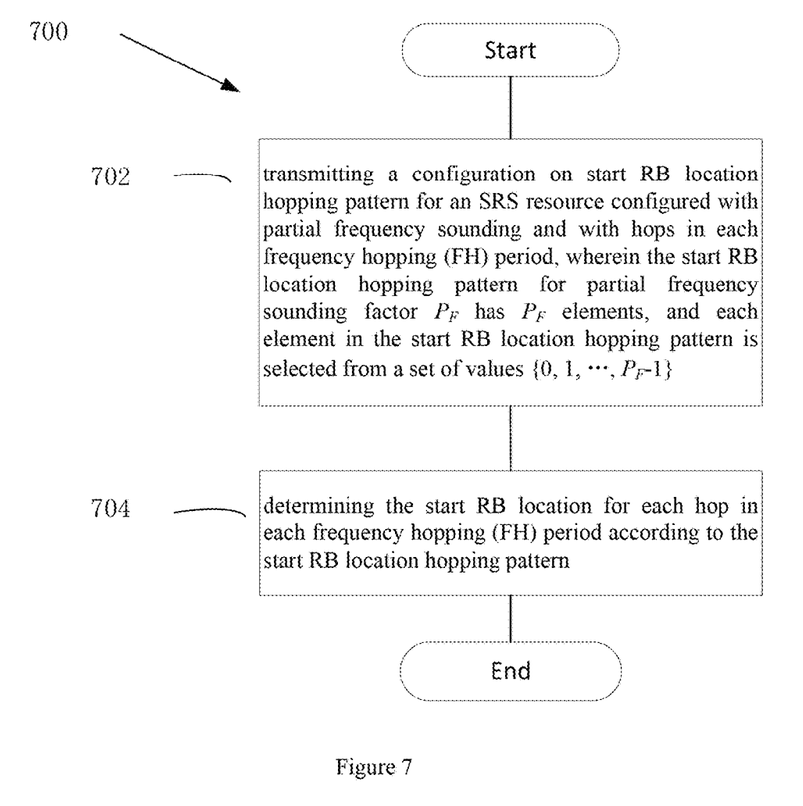
FIG. 7 is a schematic flow chart diagram illustrating a further embodiment of a method.

FIG. 7 is a schematic flow chart diagram illustrating a further embodiment of a method 700 according to the present application. In some embodiments, the method 700 is performed by an apparatus, such as a remote unit. In certain embodiments, the method 700 may be performed by a processor executing program code, for example, a microcontroller, a microprocessor, a CPU, a GPU, an auxiliary processing unit, a FPGA, or the like.

The method 700 may comprise 702 transmitting a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0,1, \ldots, P_F-1\}$; and 704 determining the start RB location for each hop in each frequency hopping (FH) period according to the start RB location hopping pattern.

The start RB location hopping pattern may be directly configured to the SRS resource. Alternatively, the start RB location hopping pattern may be configured by a hopping pattern ID. In particular, for $P_F=2$, hopping pattern ID 0 corresponds to start RB location hopping pattern $\{0, 1\}$; and hopping pattern ID 1 corresponds to start RB location hopping pattern $\{1, 0\}$, for $P_F=4$, hopping pattern ID 0 corresponds to start RB location hopping pattern $\{0, 2, 1, 3\}$; hopping pattern ID 1 corresponds to start RB location hopping pattern $\{2, 1, 3, 0\}$; hopping pattern ID 2 corresponds to start RB location hopping pattern $\{1, 3, 0, 2\}$; and hopping pattern ID 3 corresponds to start RB location hopping pattern $\{3, 0, 2, 1\}$, and for $P_F=8$, hopping pattern ID 0 corresponds to start RB location hopping pattern $\{0, 4, 2, 6, 1, 5, 3, 7\}$; hopping pattern ID 1 corresponds to start RB location hopping pattern $\{4, 2, 6, 1, 5, 3, 7, 0\}$; hopping pattern ID 2 corresponds to start RB location hopping pattern $\{2, 6, 1, 5, 3, 7, 0, 4\}$; hopping pattern ID 3 corresponds to start RB location hopping pattern $\{6, 1, 5, 3, 7, 0, 4, 2\}$; hopping pattern ID 4 corresponds to start RB location hopping pattern $\{1, 5, 3, 7, 0, 4, 2, 6\}$; hopping pattern ID 5 corresponds to start RB location hopping pattern $\{5, 3, 7, 0, 4, 2, 6, 1\}$; hopping pattern ID 6 corresponds to start RB location hopping pattern $\{3, 7, 0, 4, 2, 6, 1, 5\}$; and hopping pattern ID 7 corresponds to start RB location hopping pattern $\{7, 0, 4, 2, 6, 1, 5, 3\}$.

The start RB location hopping pattern may be configured by one element of the start RB location hopping pattern that applies to the first hop of the first frequency hopping period, and the start RB location hopping pattern is determined by a cyclic pattern of a basic hopping pattern according to the one element. The one element of the start RB location hopping pattern may be indicated by an unused field of a DCI without data and without CSI if aperiodic SRS resource(s) are triggered by the DCI.

The $\{(n \bmod P_F)+1\}^{th}$ element in the start RB location hopping pattern may apply to the start RB location of the SRS resource in all hops of the $n^{th}$ FH period. In this condition, the start RB location hopping pattern periodically applies to the every $P_F$ FH periods.

The $$\left\{\left(n_{SRS} = \left\lfloor \frac{l'}{R} \right\rfloor\right) \bmod P_F + 1\right\}^{th}$$

element of the start RB location hopping pattern may apply to the start RB location of the SRS resource in the $l'^{th}$ hop, where R is the SRS repetition number. In this condition, the start RB location hopping pattern periodically changes in $P_F$ contiguous FH periods.

The $\{(l') \bmod P_F+1\}^{th}$ element of the start RB location hopping pattern may apply to the start RB location of the SRS resource in the $l'^{th}$ hop, where R is the SRS repetition number. In this condition, the start RB location hopping pattern periodically changes in $P_F/R$ contiguous FH periods.

Figure 8:
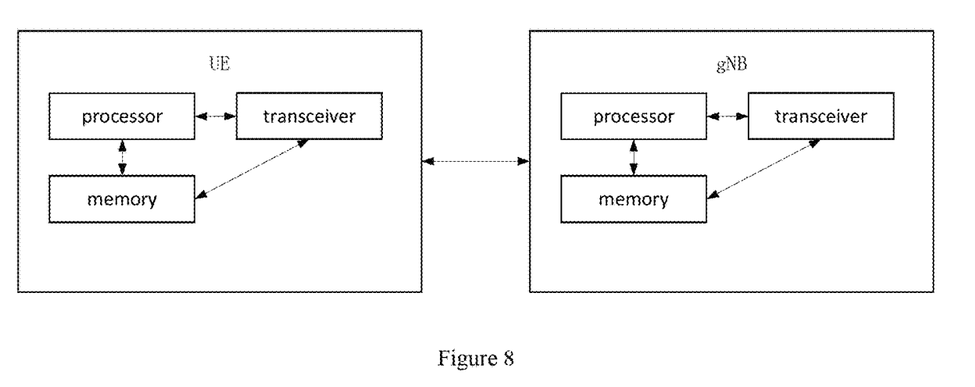
FIG. 8 is a schematic block diagram illustrating apparatuses according to one embodiment.

FIG. 8 is a schematic block diagram illustrating apparatuses according to one embodiment.

Referring to FIG. 8, the UE (i.e. the remote unit) includes a processor, a memory, and a transceiver. The processor implements a function, a process, and/or a method which are proposed in FIG. 6.

The UE comprises a receiver that receives a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0,1, \ldots, P_F-1\}$; and a processor that determines the start RB location for each hop in each frequency hopping (FH) period according to the start RB location hopping pattern.

The start RB location hopping pattern may be directly configured to the SRS resource. Alternatively, the start RB location hopping pattern may be configured by a hopping pattern ID. In particular, for $P_F=2$, hopping pattern ID 0 corresponds to start RB location hopping pattern $\{0, 1\}$; and hopping pattern ID 1 corresponds to start RB location hopping pattern $\{1, 0\}$, for $P_F=4$, hopping pattern ID 0 corresponds to start RB location hopping pattern $\{0, 2, 1, 3\}$; hopping pattern ID 1 corresponds to start RB location hopping pattern $\{2, 1, 3, 0\}$; hopping pattern ID 2 corresponds to start RB location hopping pattern $\{1, 3, 0, 2\}$; and hopping pattern ID 3 corresponds to start RB location hopping pattern $\{3, 0, 2, 1\}$, and for $P_F=8$, hopping pattern ID 0 corresponds to start RB location hopping pattern $\{0, 4, 2, 6, 1, 5, 3, 7\}$; hopping pattern ID 1 corresponds to start RB location hopping pattern {4, 2, 6, 1, 5, 3, 7, 0}; hopping pattern ID 2 corresponds to start RB location hopping pattern {2, 6, 1, 5, 3, 7, 0, 4}; hopping pattern ID 3 corresponds to start RB location hopping pattern {6, 1, 5, 3, 7, 0, 4, 2}; hopping pattern ID 4 corresponds to start RB location hopping pattern {1, 5, 3, 7, 0, 4, 2, 6}; hopping pattern ID 5 corresponds to start RB location hopping pattern {5, 3, 7, 0, 4, 2, 6, 1}; hopping pattern ID 6 corresponds to start RB location hopping pattern {3, 7, 0, 4, 2, 6, 1, 5}; and hopping pattern ID 7 corresponds to start RB location hopping pattern {7, 0, 4, 2, 6, 1, 5, 3}.

The start RB location hopping pattern may be configured by one element of the start RB location hopping pattern that applies to the first hop of the first frequency hopping period, and the start RB location hopping pattern is determined by a cyclic pattern of a basic hopping pattern according to the one element. The one element of the start RB location hopping pattern may be indicated by an unused field of a DCI without data and without CSI if aperiodic SRS resource(s) are triggered by the DCI.

The $\{(n \bmod P_F)+1\}^{th}$ element in the start RB location hopping pattern may apply to the start RB location of the SRS resource in all hops of the $n^{th}$ FH period. In this condition, the start RB location hopping pattern periodically applies to the every $P_F$ FH periods.

The $$\left\{\left(n_{SRS} = \left\lfloor \frac{l'}{R} \right\rfloor\right) \bmod P_F + 1\right\}^{th}$$

element of the start RB location hopping pattern may apply to the start RB location of the SRS resource in the $l'^{th}$ hop, where R is the SRS repetition number. In this condition, the start RB location hopping pattern periodically changes in $P_F$ contiguous FH periods.

The $\{(l') \bmod P_F+1\}^{th}$ element of the start RB location hopping pattern may apply to the start RB location of the SRS resource in the $l'^{th}$ hop, where R is the SRS repetition number. In this condition, the start RB location hopping pattern periodically changes in $P_F/R$ contiguous FH periods.

Referring to FIG. 8, the gNB (i.e. base unit) includes a processor, a memory, and a transceiver. The processors implement a function, a process, and/or a method which are proposed in FIG. 7.

The base unit comprises a transmitter that transmits a configuration on start RB location hopping pattern for an SRS resource configured with partial frequency sounding and with hops in each frequency hopping (FH) period, wherein the start RB location hopping pattern for partial frequency sounding factor $P_F$ has $P_F$ elements, and each element in the start RB location hopping pattern is selected from a set of values $\{0, 1, \ldots, P_F-1\}$; and a processor that determines the start RB location for each hop in each frequency hopping (FH) period according to the start RB location hopping pattern.

The start RB location hopping pattern may be directly configured to the SRS resource. Alternatively, the start RB location hopping pattern may be configured by a hopping pattern ID. In particular, for $P_F=2$, hopping pattern ID 0 corresponds to start RB location hopping pattern {0, 1}; and hopping pattern ID 1 corresponds to start RB location hopping pattern {1, 0}, for $P_F=4$, hopping pattern ID 0 corresponds to start RB location hopping pattern {0, 2, 1, 3}; hopping pattern ID 1 corresponds to start RB location hopping pattern {2, 1, 3, 0}; hopping pattern ID 2 corresponds to start RB location hopping pattern {1, 3, 0, 2}; and hopping pattern ID 3 corresponds to start RB location hopping pattern {3, 0, 2, 1}, and for $P_F=8$, hopping pattern ID 0 corresponds to start RB location hopping pattern {0, 4, 2, 6, 1, 5, 3, 7}; hopping pattern ID 1 corresponds to start RB location hopping pattern {4, 2, 6, 1, 5, 3, 7, 0}; hopping pattern ID 2 corresponds to start RB location hopping pattern {2, 6, 1, 5, 3, 7, 0, 4}; hopping pattern ID 3 corresponds to start RB location hopping pattern {6, 1, 5, 3, 7, 0, 4, 2}; hopping pattern ID 4 corresponds to start RB location hopping pattern {1, 5, 3, 7, 0, 4, 2, 6}; hopping pattern ID 5 corresponds to start RB location hopping pattern {5, 3, 7, 0, 4, 2, 6, 1}; hopping pattern ID 6 corresponds to start RB location hopping pattern {3, 7, 0, 4, 2, 6, 1, 5}; and hopping pattern ID 7 corresponds to start RB location hopping pattern {7, 0, 4, 2, 6, 1, 5, 3}.

The start RB location hopping pattern may be configured by one element of the start RB location hopping pattern that applies to the first hop of the first frequency hopping period, and the start RB location hopping pattern is determined by a cyclic pattern of a basic hopping pattern according to the one element. The one element of the start RB location hopping pattern may be indicated by an unused field of a DCI without data and without CSI if aperiodic SRS resource(s) are triggered by the DCI.

The $\{(n \bmod P_F)+1\}^{th}$ element in the start RB location hopping pattern may apply to the start RB location of the SRS resource in all hops of the $n^{th}$ FH period. In this condition, the start RB location hopping pattern periodically applies to the every $P_F$ FH periods.

The $$\left\{\left(n_{SRS} = \left\lfloor \frac{l'}{R} \right\rfloor\right) \bmod P_F + 1\right\}^{th}$$

element of the start RB location hopping pattern may apply to the start RB location of the SRS resource in the $l'^{th}$ hop, where R is the SRS repetition number. In this condition, the start RB location hopping pattern periodically changes in $P_F$ contiguous FH periods.

The $\{(l') \bmod P_F+1\}^{th}$ element of the start RB location hopping pattern may apply to the start RB location of the SRS resource in the $l'^{th}$ hop, where R is the SRS repetition number. In this condition, the start RB location hopping pattern periodically changes in $P_F/R$ contiguous FH periods.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
    at least one memory; and
    at least one processor coupled with the at least one memory and configured to cause the UE to:
        receive a configuration to enable start resource block (RB) location hopping for a sounding reference signal (SRS) resource configured with partial frequency sounding; and
        determine an RB location hopping pattern for each partial frequency sounding factor (PF) as follows:
        for $P_F=2$, a start RB location hopping pattern is $\{0,1\}$; and
        for $P_F=4$, a start RB location hopping pattern is $\{0,2,1,3\}$, wherein:
            an $\{(n \bmod P_F)+1\}^{th}$ element in the start RB location hopping pattern applies to a start RB location of an SRS resource in all hops of an $n^{th}$ frequency (FH) period, or an $$\left\{\left(n_{SRS} = \left\lfloor \frac{l'}{R} \right\rfloor\right) \bmod P_F + 1\right\}^{th}$$

element of the start RB location hopping pattern applies to a start RB location of an SRS resource in an $l'^{th}$ hop, where R is an SRS repetition number, or an $\{(l') \bmod P_F+1\}^{th}$ element of the start RB location hopping pattern applies to a start RB location of an SRS resource in an $l'^{th}$ hop.

2. The UE of claim 1, wherein the start RB location hopping pattern is directly configured to the SRS resource.

3. The UE of claim 1, wherein the start RB location hopping pattern is configured by a hopping pattern ID.

4. The UE of claim 1, wherein,
    the start RB location hopping pattern is configured by one element of the start RB location hopping pattern that applies to a first hop of the frequency hopping period, and
    the start RB location hopping pattern is determined by a cyclic pattern of a basic hopping pattern according to the one element.

5. The UE of claim 4, wherein the one element of the start RB location hopping pattern is indicated by an unused field of a downlink control information (DCI) without data and without channel state information (CSI) if aperiodic SRS resources are triggered by the DCI.

6. The UE of claim 1, wherein the start RB location hopping pattern periodically applies to every $P_F$ FH period.

7. The UE of claim 1, wherein the start RB location hopping pattern periodically changes in $P_F$ contiguous FH periods.

8. The UE of claim 1, wherein the start RB location hopping pattern periodically changes in $P_F/R$ contiguous FH periods.

9. A processor for wireless communication, comprising:
    at least one controller coupled with at least one memory and configured to cause the processor to:
        receive a configuration to enable start resource block (RB) location hopping for a sounding reference signal (SRS) resource configured with partial frequency sounding; and
        determine an RB location hopping pattern for each partial frequency sounding factor (PF) as follows:
        for $P_F=2$, a start RB location hopping pattern is $\{0,1\}$; and
        for $P_F=4$, a start RB location hopping pattern is $\{0,2,1,3\}$ wherein:
            an $\{(n \bmod P_F)+1\}^{th}$ element in the start RB location hopping pattern applies to a start RB location of an SRS resource in all hops of an $n^{th}$ frequency (FH) period, or an $$\left\{\left(n_{SRS} = \left\lfloor \frac{l'}{R} \right\rfloor\right) \bmod P_F + 1\right\}^{th}$$

an element of the start RB location hopping pattern applies to a start RB location of an SRS resource in an $l'^{th}$ hop, where R is an SRS repetition number, or
            an $\{(l') \bmod P_F+1\}^{th}$ element of the start RB location hopping pattern applies to a start RB location of an SRS resource in an $l'^{th}$ hop.

10. The processor of claim 9, wherein the start RB location hopping pattern is directly configured to the SRS resource.

11. The processor of claim 9, wherein the start RB location hopping pattern is configured by a hopping pattern ID.

12. The processor of claim 9, wherein,
    the start RB location hopping pattern is configured by one element of the start RB location hopping pattern that applies to a first hop of a frequency hopping period, and
    the start RB location hopping pattern is determined by a cyclic pattern of a basic hopping pattern according to the one element.

13. A method performed by a user equipment (UE), the method comprising:
    receiving a configuration to enable start resource block (RB) location hopping for a sounding reference signal (SRS) resource configured with partial frequency sounding; and
    determining an RB location hopping pattern for each partial frequency sounding factor (PF) as follows:
    for $P_F=2$, a start RB location hopping pattern is $\{0,1\}$; and for $P_F=4$, a start RB location hopping pattern is {0,2, 1,3}, wherein:

an $\{(n \bmod P_F)+1\}^{th}$ element in the start RB location hopping pattern applies to a start RB location of an SRS resource in all hops of an $n^{th}$ frequency (FH) period, or an $$\left\{\left(n_{SRS} = \left\lfloor\frac{l'}{R}\right\rfloor\right) \bmod P_F + 1\right\}^{th}$$

element of the start RB location hopping pattern applies to a start RB location of an SRS resource in an $l'^{th}$ hop, where R is an SRS repetition number, or an $\{(l') \bmod P_F+1\}^{th}$ element of the start RB location hopping pattern applies to a start RB location of an SRS resource in an $l'^{th}$ hop.

14. The method of claim 13, wherein the start RB location hopping pattern periodically applies to every $P_F$ FH period.

15. The method of claim 13, wherein the start RB location hopping pattern periodically changes in $P_F$ contiguous FH periods.

16. The method of claim 13, wherein the start RB location hopping pattern periodically changes in $P_F/R$ contiguous FH periods.

17. The method of claim 13, wherein the start RB location hopping pattern is directly configured to the SRS resource.

18. The method of claim 13, wherein the start RB location hopping pattern is configured by a hopping pattern ID.

19. The method of claim 13, wherein, the start RB location hopping pattern is configured by one element of the start RB location hopping pattern that applies to a first hop of a frequency hopping period, and the start RB location hopping pattern is determined by a cyclic pattern of a basic hopping pattern according to the one element.

* * * * *